Jan. 19, 1943.  A. G. SCHNEIDER  2,308,547
VARIABLE SPEED TRANSMISSION
Filed July 25, 1939  4 Sheets-Sheet 4

Patented Jan. 19, 1943

2,308,547

UNITED STATES PATENT OFFICE 2,308,547

VARIABLE SPEED TRANSMISSION

Adolf G. Schneider, Muncie, Ind., assignor, by mesne assignments, to Schneider Brothers Company, a copartnership composed of Heinrich Schneider and Viva Schneider, both of Hamilton, Ohio, and Adolf G. Schneider and Erna Schneider, both of Muncie, Ind.

Application July 25, 1939, Serial No. 286,411

30 Claims. (Cl. 74—189.5)

This invention relates to variable speed transmissions and has particular reference to ones in which Föttinger type hydraulic torque converters are combined with mechanical power transmitting means in order to obtain better operating characteristics than would be obtainable from either the hydraulic or mechanical means alone.

The principal object of my invention is to provide a hydraulic transmission in combination with an auxiliary gear drive which will permit the torque obtained from the torque converter to be transmitted to the driven shaft either with direct drive or at a fixed drive ratio.

Still another important object of the invention is to provide a combination transmission of the kind mentioned in which the characteristics of the torque converter are also made available in reverse drive without the necessity for any extra gears.

A further object is to provide such a combination transmission of more compact form than has hitherto been obtainable so far as I am aware, whereby to enable use thereof in certain cases where limited space would make other transmissions impractical, the present transmission being furthermore so designed as to reduce so far as possible the number of parts required and also to reduce the cost thereof to a minimum.

Other objects of the invention will appear from the following description in which reference is made to the accompanying drawings, wherein—

Similar reference numerals are applied to corresponding parts throughout the views.

Figure 1:
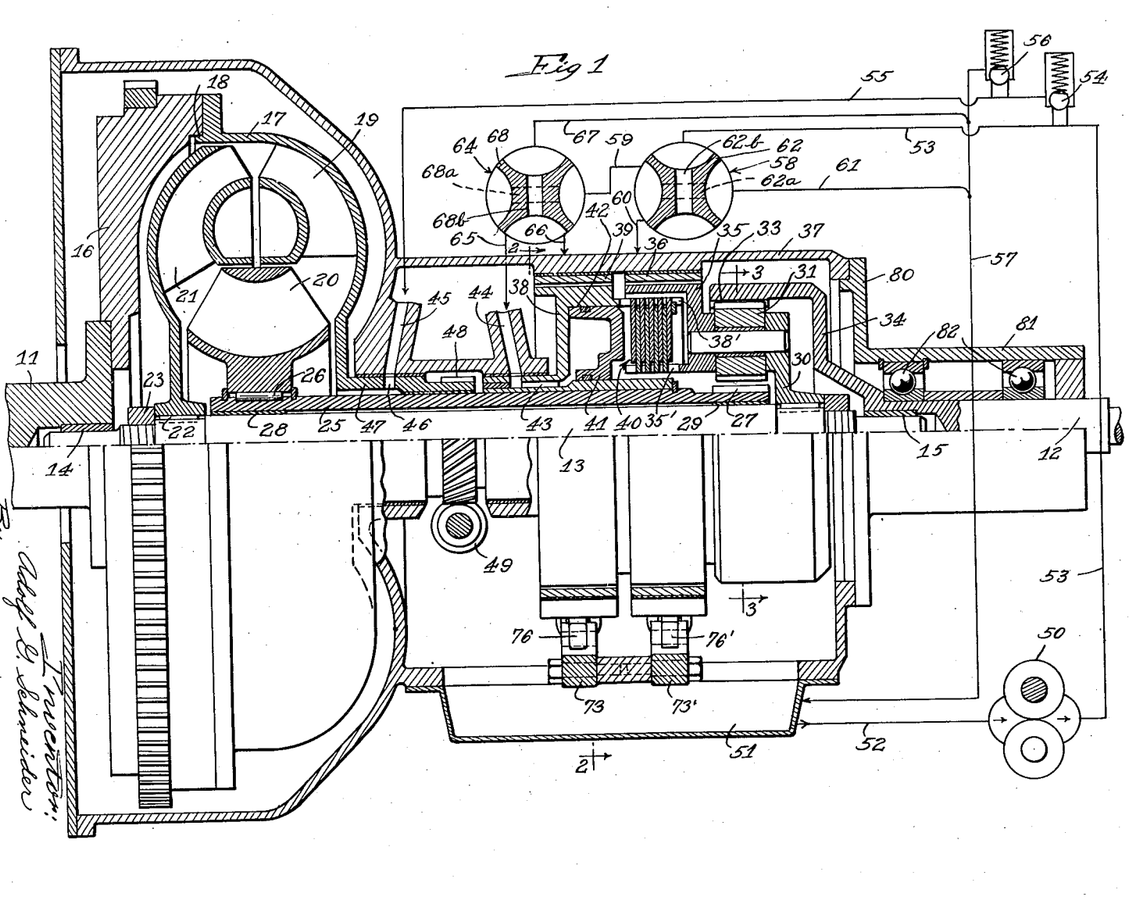
Figure 1 is a longitudinal section through a transmission made in accordance with my invention and showing in connection therewith a diagram of the hydraulic control circuit.
Figure 2:
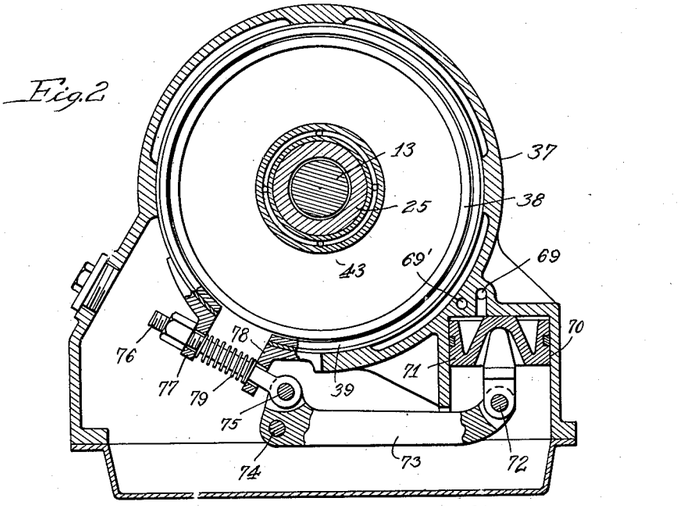
Figs. 2 and 3 are sections on the correspondingly numbered lines of Fig. 1.
Figures 3, 4:
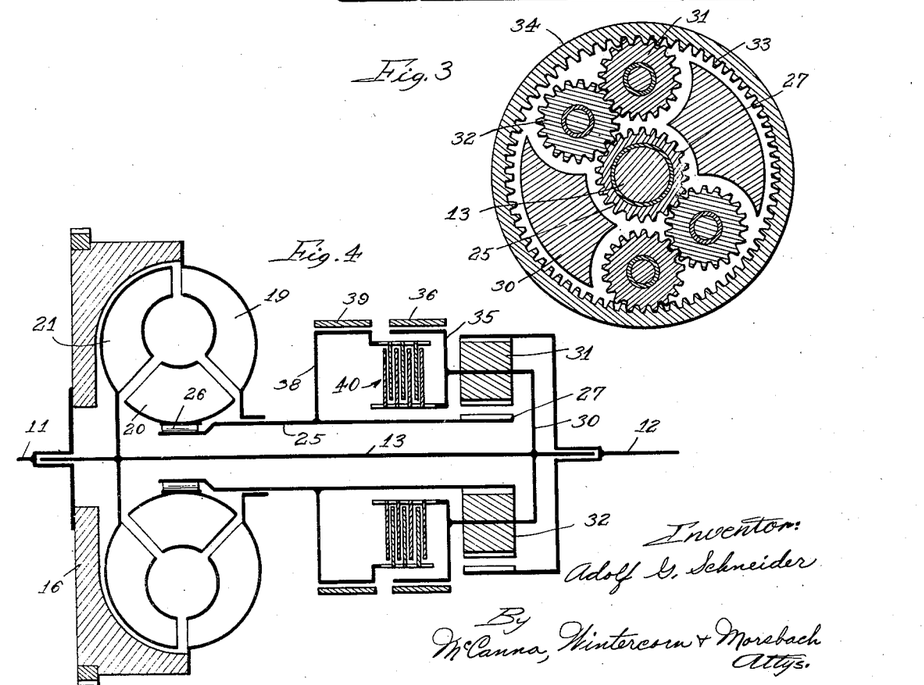
Fig. 4 is a diagrammatic view of the transmission of Figure 1 to illustrate more clearly the mode of operation thereof.
Figure 5:
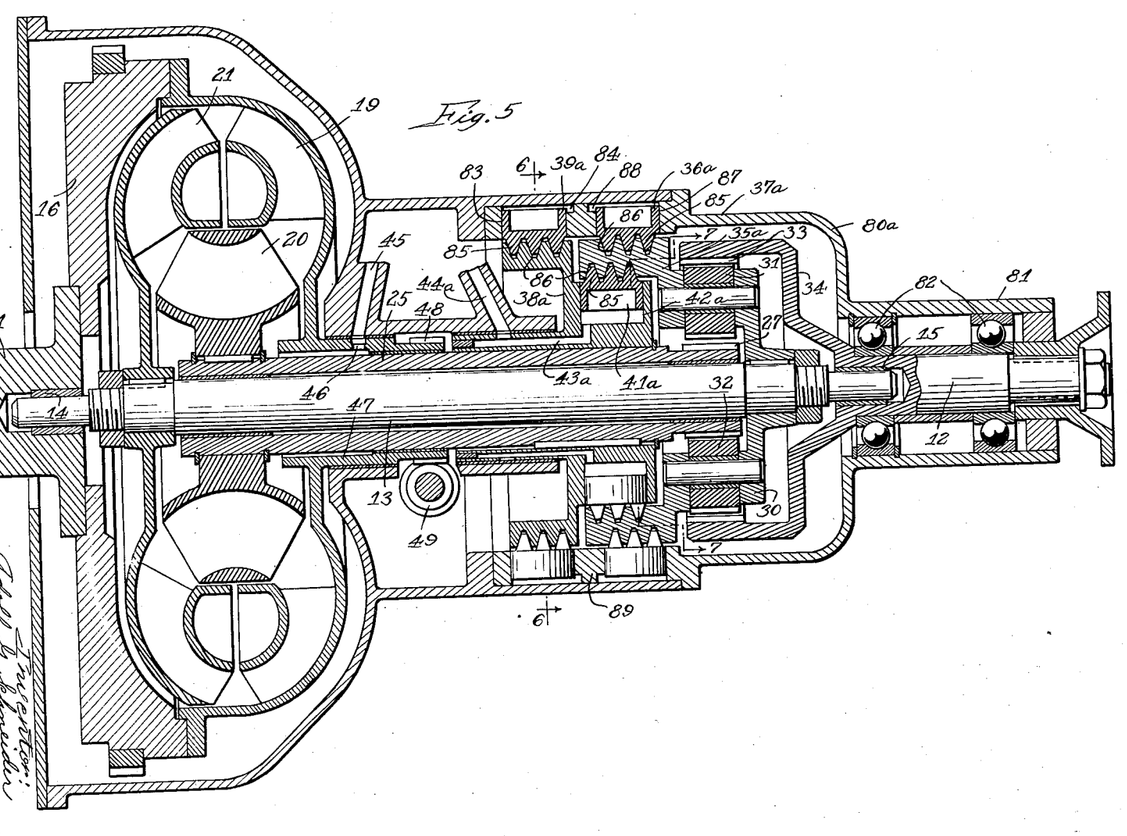
Fig. 5 is a longitudinal section through another transmission made in accordance with my invention.

Referring first to Figs. 1 to 4, 11 is the driving shaft, which may be the crank shaft of an internal combustion engine or any other prime mover, 12 is the driven shaft, and 13 is the intermediate shaft supported at its opposite ends in pilot bearings 14 and 15, provided therefor in the adjacent ends of the driving and driven shafts respectively. The fly wheel 16 turning with the shaft 11 has a housing 17 mounted thereon and centered with relation thereto by means of a pilot portion 18. The housing 17 contains impeller blades 19 of a torque converter, 20 being the reaction member and 21 the turbine wheel or runner, the blades of which cooperate with the blades of the impeller 19 to complete the well known vortex type circuit. The runner 21 is fixed as by means of a key 22 and nut 23 on the reduced forward end of the intermediate shaft 13. The reaction member 20 may be keyed on the forward end of a sleeve 25 as indicated in Fig. 5, although I prefer, as shown in Figs. 1 and 4, to provide a freewheeling clutch 26 between the reaction member 20 and the sleeve 25 to permit the reaction member to overrun the sleeve 25 in a forward direction. A sun gear 27 is provided preferably as an integral part of the sleeve 25 at the rearward end, and the intermediate shaft 13, which extends through the sleeve 25, as shown, and provides bearing support therefor at 28 and 29, has rigidly attached to its rear end a planetary cage 30 containing intermeshed pairs of planetary gears 31—32 arranged so that the gears 32 mesh with sun gear 27 as clearly appears in Fig. 3. The other gears 31 mesh with the ring gear 33 formed on the inside of the rim of a drum 34 shown as an integral extension on the forward end of the driven shaft 12. The planetary cage 30 has a brake drum 35 turning therewith arranged to be engaged by a brake band 36 fixed to the housing 37. In a similar manner another brake drum 38 turning with the sleeve 25 cooperates with a brake band 39 that is also fixed to the housing 37. A multiple disc friction clutch is shown at 40 for locking the drums 35 and 38 together, one set of the discs in the clutch 40 being carried on the tubular extension 35' of the drum 35 and the other set being carried on the concentrically disposed tubular extension 38' of the drum 38. The clutch 40 is arranged to be operated by an annular piston 41 slidable in an annular bore 42 provided in the drum 38 concentric with the hub thereof, said piston 41 being operable by oil pressure, oil being delivered to the bore 42 behind the piston 41 through communicating passages 43 and 44. The passage 44, like another passage 45 that communicates with radial ports 46 in the central tubular extension 47 of the housing 17, is provided in an integral portion of the housing 37. The tubular extension 47 of the housing 17 has a helical gear 48 provided thereon meshing with another helical gear 49 whereby to drive a high pressure pump 50 with the impeller 19.

The pump 50 takes oil from the sump 51 through the suction line 52 and delivers it under high pressure to the pressure line 53. Relief valve 54 is adjusted to maintain the desired pressure in the line 53, and the pump 50 is designed to deliver a substantially larger capacity than necessary for the present purposes so that the oil which bypasses valve 54 into the low pressure line 55 can be used to supply the torque converter with operating fluid through passage 45 and communicating ports 46. The low pressure relief valve 56 serves to maintain the oil supply line to the converter under a predetermined pressure, the excess oil bypassing through line 57 back to the sump 51. The high pressure line 53 communicates with the body of a valve 58 which controls delivery of oil to lines 59 and 60 and drain line 61 according to the position of the rotor 62 of the valve 58, said rotor being adapted to connect the pressure line 53 with either of the lines 59 and 60, at the same time connecting the drain line 61 with the other of said lines. The drain line 61 connects with the drain line 57 connected to the sump 51. In its neutral position valve 58 has both of the lines 59 and 60 in communication with the drain line 61 through the port 62a, the other port 62b in this position of the valve being in communication with the pressure line 53 only. The line 59 extends to the body of another valve 64 which controls delivery of oil to two lines 65 and 66 and drain line 67, according to the position of the rotor 68. The valve 64 will connect the line 59 with either of the lines 65 and 66, while the other of said lines is connected with the drain line 67, the rotor 68 being provided with ports 68a and 68b for that purpose. The drain line 67 is connected with the drain line 57 similarly as the drain line 61. The line 65 is shown in Figure 1 extending to the passage 44 for delivery of oil under pressure to operate the piston 41 so as to engage the clutch 40. In a similar manner the line 66 is shown in Figure 1 as extending toward the brake band 39, the line being connected with a passage 69 in the wall of the housing 37 leading to the cylinder 70 shown in Fig. 2, wherein a piston 71 operates to actuate the brake band 39. The piston 71 as illustrated in Fig. 2 has pivotal connection at 72 to the end of a bell-crank lever 73 pivoted at 74 in the housing 37 and pivotally connected at 75 to a link 76 that is adjustably connected to the movable end 77 of the brake band 39. The other end 78 of the brake band is fixed to the housing 37, and a coiled compression spring 79 acting between the ends 77 and 78 serves normally to urge them apart so that there is no drag on the drum 38 which the band 39 surrounds. The line 60 is shown in Figure 1 extending toward the brake band 36 and it communicates with another passage 69' in the wall of the housing 37 leading to another cylinder similar to the cylinder 70 shown in Fig. 2 to operate a piston similar to the piston 71, which in turn operates a bell-crank lever 73' connected with the free end of the brake band 36 by means of a link 76' as indicated in Figure 1.

The operation is as follows:

With both valves 58 and 64 in neutral position, the control lines 60, 65, and 66 are all under atmospheric pressure, being connected with the drain line 57, so that the clutch 40 and brake bands 36 and 39 are disengaged. Under these conditions no power will be transmitted to the driven shaft 12 although the driving shaft 11 and each wheel of the torque converter may be rotating. However, if the rotor 62 of the valve 58 is turned in a counterclockwise direction through approximately 45° to establish communication between the high pressure line 53 and the line 59, and the rotor 68 of the valve 64 is turned in a clockwise direction through approximately 45° to interconnect the line 66 with the line 59, oil under pressure is delivered to the cylinder 70 to operate the piston 71 and accordingly tighten the brake band 39 on the drum 38 so that the sleeve 25 will be locked against rotation with respect to the housing 37. The reaction member 20 of the torque converter being now held stationary, the torque converter functions in the normal manner to transmit torque to the runner 21 and accordingly to the intermediate shaft 13 at a speed which will vary according to the speed of the engine turning the driving shaft 11. This torque will be transmitted to the driven shaft 12 multiplied by a certain fixed ratio, which is that of the dual planetary gearing whose sun gear 27 under these conditions is held stationary, the latter being on the same sleeve 25 with the reaction member 20. In other words, as the intermediate shaft is driven by the runner 21 of the torque converter, the planetary cage 30 is turned and the planetary gears 32 meshing with the stationary sun gear 27 drive the planetary gears 31 and they, in turn, transmit drive to the ring gear 33 so as to drive the driven shaft 12 at reduced speed but in the same direction as the shafts 11 and 13, the reduction in speed depending upon the ratio of the sun gear 27 to the ring gear 33. This is the low speed drive, and it will be clear that if a free-wheeling clutch 26 is provided between the reaction member 20 and the sleeve 25, the clutch 26 will hold the reaction member against turning in the reverse direction relative to the runner 21, but when the runner 21 attains a speed approximately the same as the impeller 19, the reaction member 20 will under such conditions float so as not to offer any resistance to the flow of the fluid.

Direct drive is obtainable by simply turning the rotor 68 of the valve 64 in a counterclockwise direction through approximately 45° from the position shown in Figure 1 to interconnect the line 59 with the line 65 so that oil under pressure will be delivered through the passages 44 and 43 to the bore 42 so as to operate the piston 41 to engage the clutch 40. In this new position of the rotor 68 of the valve 64, the line 66 is placed in communication with the drain lines 67 and 57 so that the brake band 39 is disengaged. Now, with the clutch 40 engaged and the brake band 39 disengaged, the drums 35 and 38 are locked together so that the shaft 13 and sleeve 25 are free to turn as a unit with respect to the housing 37. The torque converter then acts as a hydraulic clutch with the runner 21 and reaction member 20 playing the part of the secondary or driven member of the clutch and, of course, there is no torque multiplication under these conditions. Furthermore since two parts of the dual planetary gearing are locked together, the drum 34 carrying the third part 33 will also be locked to turn with the shaft 13 and sleeve 25 for direct drive. Obviously since the torque range of the converter alone is large enough to serve as a substitute for an ordinary three-speed passenger car transmission, the direct drive just described can easily replace the overdrive feature when used with a high rear axle ratio for a passenger car without impairing its good acceleration characteristics on starting.

Reverse drive is obtainable by simply turning the rotor 62 of the valve 58 in a clockwise direction through approximately 45° from the position shown in Figure 1 so as to place the line 60 in communication with the high pressure line 53 while placing the other line 59 in communication with the drain line 61. The release of pressure from line 59 results in the disengagement of the brake band 39 and clutch 40 regardless of the position of the rotor 68 of valve 64, whereas the delivery of oil under pressure to line 60 results in the engagement of the brake band 36 to lock the drum 35 to the housing 37 and accordingly lock the planetary cage 30, intermediate shaft 13, and runner 21 against rotation with respect to the housing 37 and leaving the sleeve 25, reaction member 20, and sun gear 27 free to rotate in the opposite direction relative to the driving shaft 11 so as to transmit reverse drive to the driven shaft 12 through the planetary gears 31—32 and ring gear 33, a reduction in speed being obtained at a ratio determined by the ratio of the sun gear 27 to the ring gear 33 similarly as in low speed drive. In other words, I have taken advantage of inherent characteristics of hydraulic torque converters and have utilized the reaction member 20 as a runner for reverse drive, the runner 21 under these conditions serving as the reaction member and being held stationary for that purpose. Aside from the advantage that there is no necessity for extra gears for reverse drive, the present arrangement has the important advantage of affording torque multiplication similarly as in low speed forward drive at a ratio determined by the gear ratio of the sun gear 27 to the ring gear 33. In forward drive the ratio in the converter is relatively great and the ratio of the planetary gears relatively small, while in reverse drive the ratio in the converter is relatively small, and the ratio in the planetary gears relatively great. Here again it is apparent that where a free-wheeling clutch 26 is provided between the reaction member 20 and the sleeve 25, it will not interfere with the transmission of power from the reaction member 20 to the sleeve 25 in reverse drive.

In passing it will be observed that I have provided a cover 80 arranged to be secured onto the rear end of the housing 37, the same having a tubular extension 81 mounting bearings 82 therein for support of the driven shaft 12 in concentric relation with the shafts 11 and 13.

Figure 6:
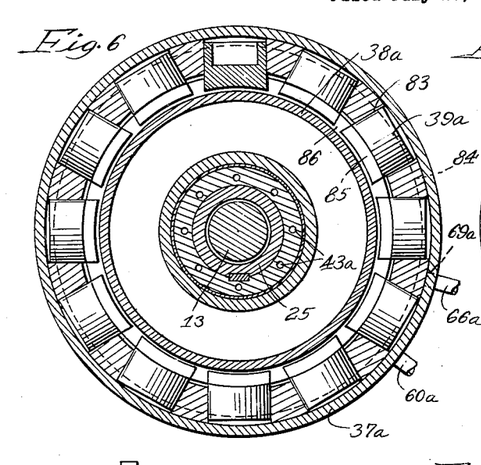
Figs. 6 and 7 are sections on the correspondingly numbered lines of Fig. 5.
Figure 7:
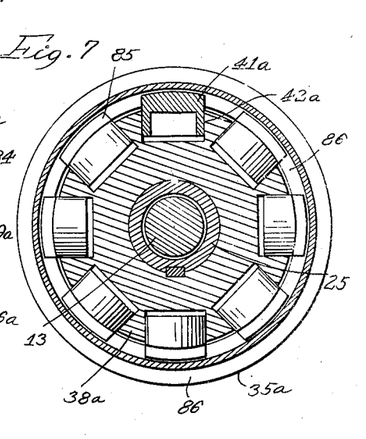

Referring now to Figs. 5, 6, and 7, I have shown another transmission similar to the one just described but having drums 35a and 38a instead of the previously described drums 35 and 38 respectively, the drum 35a being arranged to be clutched to the housing 37a by means of a plurality of circumferentially spaced hydraulically operable pistons 36a instead of by means of the previously described brake band 36, and the drum 38a being arranged to be clutched to the housing 37a similarly by means of a plurality of circumferentially spaced hydraulically operable pistons 39a instead of by means of the aforementioned brake band 39. In a similar manner the aforementioned piston 41 for operating the aforementioned friction clutch 40 is replaced by a plurality of hydraulically operable pistons 41a for clutching the drums 35a and 38a together. The construction of this transmission may otherwise be the same as either of the transmissions shown in Figs. 1 and 4. The pistons 39a are reciprocable in radial bores 83, the outer ends of which are all interconnected by the annular groove 84 with which a passage like the passage 69 in Fig. 2 has communication as indicated at 69a in Fig. 6, the passage 69a having a line 66a communicating therewith, corresponding to the line 66 illustrated in Figure 1, whereby all of the pistons 39a are arranged to be operated substantially simultaneously and under substantially equal pressure whenever the rotor 68 of the valve 64 cooperating with this transmission is turned to the proper position as previously described. All of the pistons 39a have arcuate V-shaped ribs 85 provided on the inner ends thereof in parallel planes fitting in annular V-shaped grooves 86 provided on the outer periphery of the drum 38a whereby to provide proportionately increased area of engagement and also wedging engagement between the pistons and the drum to insure positive gripping of the drum 38a when the pistons 39a are operated under hydraulic pressure. The pistons 36a operate in other radial bores 87 interconnected by an annular groove 88 with which a line corresponding to the line 60 in Figure 1 has communication as indicated at 60a in Fig. 6. These pistons 36a likewise have V-shaped ribs 85 working in V-shaped grooves 86 in the outer periphery of the drum 35a, and it is obvious that when the rotor 62 of the valve 58 provided in connection with this transmission is turned to the proper position to deliver oil under pressure to the groove 88 all of the pistons 36a will be operated under pressure substantially simultaneously whereby to lock the drum 35a. The pistons 41a previously mentioned operate in radial bores 42a provided in the hub portion of the drum 38a with which a plurality of passages 43a communicate. The passages 43a all are supplied with oil under pressure from the passage 44a through a line corresponding to the line 65 when the rotor 68 of the valve 64 provided in connection with this transmission is turned to the proper position. Upon delivery of oil under pressure to the bores 42a, all of the pistons 41a are operated substantially simultaneously to lock the drums 35a and 38a together. The pistons 41a like the pistons 36a and 39a have V-shaped ribs 85 operating in V-shaped annular grooves provided on the inner periphery of the drum 35a. The bores 83 and 87, it will be noticed, are provided in a tubular extension 89 of the rear cover-plate 80a. The operation of this transmission is the same as that previously described.

Figure 8:
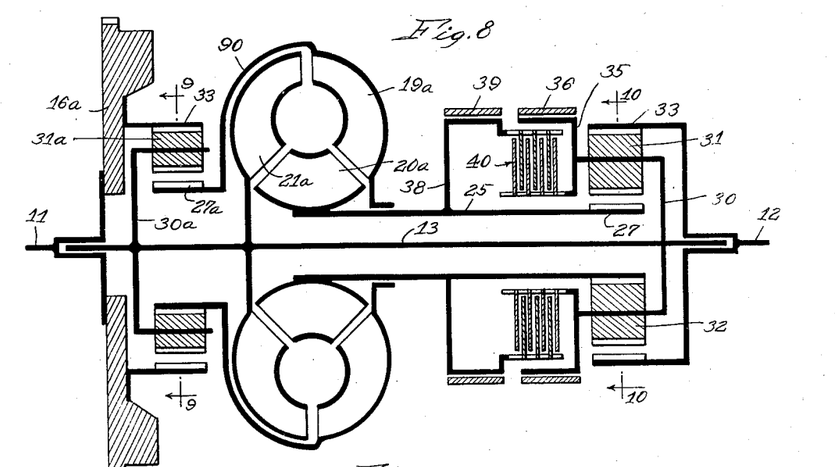
Fig. 8 is a diagrammatic view of still another transmission made in accordance with my invention.
Figure 9:
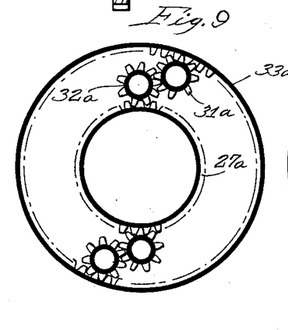
Figs. 9 and 10 are sections on the correspondingly numbered lines of Fig. 8.
Figure 10:
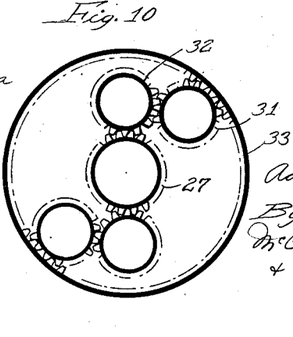

The transmission illustrated in Figs. 8, 9, and 10 is an adaptation of that shown in Figure 1 intended for vehicles in which reduction in space required and also in weight are essential or desirable. In this transmission the flywheel 16a carries a ring gear 33a meshing with planetary gears 31a provided on a cage 30a mounted on the front end of the intermediate shaft 13, the shaft 13 also carrying on the rear end thereof another planetary cage 30 similarly as in the transmissions of Figs. 1 and 5 with planetary gears 31—32 provided thereon between the ring gear 33 and sun gear 27. The planetary gears 31a mesh with companion gears 32a to transmit drive to the sun gear 27a that is connected with the impeller 19a whereby to drive the impeller 19a in the same direction as the shaft 11 at an increased speed in relation to the speed of the shaft 11 in proportion to the ratio of ring gear 33a to sun gear 27a. In starting from a standstill when the runner 21a is stationary, it is obvious that the high speed driving of the impeller 19a relative to the runner 21a and reaction member 20a will permit the shaft 12 to carry a far greater load than would be permitted if the impeller 19a were driven at the same speed as the shaft 11, as in the case of impellers 19 in the transmissions of Figs. 1 and 5. As the runner 21a picks up speed, the ratio of the speed of the impeller 19a and the speed of the shaft 11 will progressively become smaller and the load carrying capacity of the impeller will also decrease so that this arrangement serves to prevent racing of the engine in starting of the car, similarly as described in the copending application of Heinrich Schneider and myself, Serial No. 196,874, filed March 19, 1938. The fact that the impeller 19a of the torque converter in this transmission can be driven at such greatly increased speed, the impeller 19a and sun gear 27a together with the intermediate housing wall 90 constituting a floating rotor or inertia flywheel, in which energy may be stored during the starting period, permits the desired reduction in size and weight of the torque converter. The operation of this transmission aside from this is the same as the others.

It is believed the foregoing description conveys a good understanding of the objects and advantages of my invention. The appended claims have been drawn with a view to covering all legitimate modifications and adaptations.

I claim:

1. A transmission comprising in combination with driving and driven elements, a turbine ring type torque converter comprising a pump impeller, a turbine wheel and a reaction element, means providing a driving connection between said pump impeller and said driving element, a planetary type transmission mechanism comprising a ring gear carried on and driving the driven element, a sun gear turning with the reaction element, and planetary gears between the ring gear and sun gear carried on a cage turning with the turbine wheel, a drum turning with the turbine wheel, another drum turning with the reaction element, brake means cooperating with said drums selectively to hold the same against turning, and clutch means for interconnecting said drums when neither is held against turning.

2. A transmission comprising in combination with driving and driven elements, a turbine ring type torque converter comprising a pump impeller, a turbine wheel and a reaction element, said pump impeller being driven by the driving element, a planetary type transmission mechanism comprising a ring gear carried on and driving the driven element, a sun gear turning with the reaction element, and planetary gears between the ring gear and sun gear carried on a cage turning with the turbine wheel, and an overrunning clutch permitting rotation of the reaction element in one direction relative to the sun gear.

3. A transmission comprising, in combination with driving and driven elements, a turbine ring type torque converter comprising a pump impeller, a turbine wheel and a reaction element, a planetary type transmission mechanism comprising a ring gear carried on and driving the driven element, a sun gear turning with the reaction element, and planetary gears between the ring gear and sun gear carried on a cage turning with the turbine wheel, and another planetary type transmission mechanism between the driving element and the torque converter comprising a ring gear driven by the driving element, a sun gear driving the pump impeller, and planetary gears between the ring gear and sun gear, said planetary gears being connected to revolve with and transmit torque to the turbine wheel.

4. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a support stationary with respect to said driving and driven elements, means on said support for resisting turning of the turbine wheel, and other means on said support for resisting turning of the reaction element.

5. A transmission comprising in combination with driving and driven elements, a turbine ring type torque converter comprising a pump impeller, a turbine wheel and a reaction element, means providing a driving connection between said pump impeller and said driving element, a planetary type transmission mechanism comprising a ring gear carried on and driving the driven element, a sun gear turning with the reaction element, and planetary gears between the ring gear and sun gear carried on a cage turning with the turbine wheel, a support stationary with respect to said driving and driven elements, means on said support for resisting turning of the turbine wheel including the planetary cage, other means on said support for resisting turning of the reaction element including the sun gear, and clutch means including engageable elements turning with the aforesaid planetary cage and sun gear for detachably connecting the turbine wheel and reaction element to revolve as a unit.

6. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a support stationary with respect to said driving and driven elements, and means on said support for resisting turning of the turbine wheel.

7. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a housing stationary with respect to said driving and driven elements, a drum turning with the planetary cage and turbine wheel, and a brake means supported in said housing against turning and arranged to frictionally engage said drum.

8. A transmission as set forth in claim 7, including a second drum turning with the sun gear and reaction element, and another brake means supported in said housing against turning and arranged frictionally to engage said second drum.

9. A transmission as set forth in claim 7, including a second drum turning with the sun gear and reaction element, another brake means supported in said housing against turning and arranged frictionally to engage said second drum, and clutch means for detachably connecting the two drums.

10. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, and a planetary type transmission mechanism comprising a ring gear carried on and driving the driven element, a sun gear turning with the reaction element, a cage for planetary gears turning with the turbine wheel, and one or more pairs of intermeshed planetary gears mounted on said cage, one of each pair meshing with the sun gear and the other with the ring gear.

11. A transmission comprising in combination with driving and driven elements, a turbine ring type torque converter comprising a pump impeller, a turbine wheel and a reaction element, a planetary type transmission mechanism comprising a ring gear carried on and driving the driven element, a sun gear turning with the reaction element, a cage for planetary gears turning with the turbine wheel, and one or more pairs of intermeshed planetary gears mounted on said cage, one of each pair meshing with the sun gear and the other with the ring gear, and a second planetary type transmission mechanism between the driving element and the torque converter comprising a ring gear driven by the driving element, a sun gear driving the pump impeller, a planetary cage turning with the turbine wheel, and one or more pairs of intermeshed planetary gears between the sun gear and ring gear, one of each pair meshing with the ring gear and the other with the sun gear.

12. A transmission comprising in combination with driving and driven elements, a turbine ring type torque converter comprising a pump impeller, a turbine wheel and a reaction element, said pump impeller being driven by the driving element, a planetary type transmission mechanism comprising a ring gear carried on and driving the driven element, a sun gear turning with the reaction element, and planetary gears between the ring gear and sun gear carried on a cage turning with the turbine wheel, and clutch means including engageable elements turning with the aforesaid planetary cage and sun gear for detachably connecting said turbine wheel and reaction elements to turn together.

13. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a support stationary with respect to said driving and driven elements, and means acting between said support and said reaction element for resisting turning of the latter.

14. A transmission as set forth in claim 13, including clutch means including engageable elements turning with the aforesaid planetary cage and sun gear for detachably connecting said turbine wheel and reaction element to turn together.

15. A transmission comprising, in combination, coaxially arranged driving and driven shafts and an intermediate shaft, a turbine ring type torque converter comprising a pump impeller driven by the driving shaft, a turbine wheel mounted on and driving the intermediate shaft, and a reaction element disposed in vortex fluid circuit relation with the pump impeller and turbine wheel, a sleeve surrounding the intermediate shaft and having said reaction element mounted thereon to turn therewith, and a planetary type transmission mechanism comprising a sun gear carried on and turning with said sleeve, a ring gear carried on and driving the driven shaft, and planetary gears between the ring gear and sun gear mounted on a cage carried on and turning with the intermediate shaft.

16. A transmission as set forth in claim 15, including an overrunning clutch between the reaction element and the sleeve, permitting turning of the reaction element only in one direction relative to the sleeve.

17. A transmission as set forth in claim 15, including a second planetary type transmission mechanism between the driving shaft and the torque converter comprising a ring gear driven by the driving shaft, a sun gear carried on and transmitting drive to the pump impeller, and planetary gears between the ring gear and sun gear carried on a cage mounted on and transmitting drive to the intermediate shaft.

18. A transmission as set forth in claim 15, including a housing stationary with respect to the shafts, a drum turning with said sleeve, another drum turning with the intermediate shaft, brake means acting between the housing and said drums to hold the same against turning with respect to said housing, and clutch means for interconnecting said drums.

19. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a support stationary with respect to said driving and driven elements, means on said support for resisting turning of the turbine wheel, and clutch means including engageable elements turning with the aforesaid planetary cage and sun gear for detachably connecting said turbine wheel and reaction element to turn together.

20. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a drum turning with the turbine wheel, another drum turning with the reaction element, brake means cooperating with said drums selectively to hold the same against turning, and clutch means for interconnecting said drums when neither is held against turning.

21. A transmission as set forth in claim 20, wherein the means providing a driving connection between said pump impeller and said driving element comprises another planetary type transmission mechanism comprising a ring gear driven by the driving element, a sun gear driving the pump impeller and planetary gears between the last mentioned ring gear and sun gear, said last mentioned planetary gears being connected to revolve with and transmit torque to the turbine wheel.

22. A transmission as set forth in claim 20, wherein the means providing a driving connection between said pump impeller and said driving element comprises another planetary type transmission mechanism comprising a ring gear driven by the driving element, a sun gear driving the pump impeller, and one or more pairs of planetary gears between the last mentioned ring gear and sun gear carried on a cage turning with the turbine wheel, one of each pair meshing with the last mentioned sun gear and the other with the last mentioned ring gear.

23. A transmission comprising in combination with driving and driven elements, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, said pump impeller being driven by the driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, a support stationary with respect to said driving and driven elements, means acting between said support and said reaction element for resisting turning of the latter, and clutch means including engageable elements turning with the aforesaid planetary cage and sun gear for detachably connecting said turbine wheel and reaction element to turn together.

24. A transmission comprising in combination with driving and driven element, a turbine ring type torque converter comprising a pump impeller, a turbine wheel and a reaction element, means providing a driving connection between said pump impeller and said driving element, a planetary type transmission mechanism comprising a ring gear carried on and driving the driven element, a sun gear turning with the reaction element, and one or more pairs of planetary gears between the ring gear and sun gear carried on a cage turning with the turbine wheel, one of each pair meshing with the sun gear and the other with the ring gear, and clutch means including engageable elements turning with the aforesaid planetary cage and sun gear for detachably connecting the turbine wheel and reaction element to turn together.

25. A transmission as set forth in claim 24, wherein the means providing a driving connection between said pump impeller and said driving element comprises another planetary type transmission mechanism comprising a ring gear driven by the driving element, a sun gear driving the pump impeller and planetary gears between the last mentioned ring gear and sun gear, said last mentioned planetary gears being connected to revolve with the transmit torque to the turbine wheel.

26. A transmission as set forth in claim 24, wherein the means providing a driving connection between said pump impeller and said driving element comprises another planetary type transmission mechanism comprising a ring gear driven by the driving element, a sun gear driving the pump impeller, and one or more pairs of planetary gears between the last mentioned ring gear and sun gear carried on a cage turning with the turbine wheel, one of each pair meshing with the last mentioned sun gear and the other with the last mentioned ring gear.

27. A transmission comprising in combination with driving and driven element, a three-part turbine ring type torque converter comprising a pump impeller, a turbine wheel and a reaction element, said impeller, turbine wheel and reaction element being disposed so that fluid provided in said converter flows from said impeller to the turbine wheel and thence to the reaction element and back to the impeller in the operation of said converter, a planetary type transmission mechanism comprising a ring gear carried on and driving the driven element, a sun gear turning with the reaction element, a cage for planetary gears turning with the turbine wheel, and one or more pairs of intermeshed planetary gears mounted on said cage, one of each pair meshing with the sun gear and the other with the ring gear, and a second planetary type transmission mechanism between the driving element and the torque converter comprising a ring gear driven by the driving element, a sun gear driving the pump impeller, and planetary gears between the last mentioned ring gear and sun gear, said planetary gears being connected to revolve with and transmit torque to the turbine wheel.

28. A transmission comprising in combination with driving and driven elements, a turbine ring type torque converter comprising a pump impeller, a turbine wheel and a reaction element, a planetary type transmission mechanism comprising a ring gear carried on and driving the driven element, a sun gear turning with the reaction element, and planetary gears between the ring gear and sun gear carried on a cage turning with the turbine wheel, and a second planetary type transmission mechanism between the driving element and the torque converter comprising a ring gear driven by the driving element, a sun gear driving the pump impeller, a planetary cage turning with the turbine wheel, and one or more pairs of intermeshed planetary gears between the sun gear and last mentioned ring gear, one of each pair meshing with the last mentioned ring gear and the other with the last mentioned sun gear.

29. In a transmission, the combination of driving and driven elements, a turbine ring type torque converter comprising a pump impeller, a turbine wheel and a reaction element, means providing a driving connection between said pump impeller and said driving element, a planetary type transmission mechanism comprising a ring gear carried on and driving the driven element, a sun gear turning with the reaction element, and planetary gears between the ring gear and sun gear carried on a cage turning with the turbine wheel, hydraulically operable clutch means including engageable elements turning with the aforesaid planetary cage and sun gear for detachably connecting said turbine wheel and reaction element to turn together, pump means for supplying oil under pressure, means for conducting oil from the pump means to the torque converter, and means for conducting oil from the pump means to said clutch means.

30. In a transmission, the combination of driving and driven elements, a turbine ring type torque converter comprising a pump impeller, a turbine wheel and a reaction element, means providing a driving connection between said pump impeller and said driving element, a planetary type transmission mechanism comprising a ring gear carried on and driving the driven element, a sun gear turning with the reaction element, and planetary gears between the ring gear and sun gear carried on a cage turning with the turbine wheel, a drum turning with the turbine wheel, another drum turning with the reaction element, hydraulically operable brake means cooperating with said drums selectively to hold the same against turning, hydraulically operable clutch means for interconnecting said drums when neither is held against turning, pump means for supplying oil under pressure, means for conducting oil from the pump means to the torque converter, and means for conducting oil from the pump means to said clutch means and brake means.

ADOLF G. SCHNEIDER.

CERTIFICATE OF CORRECTION.

Patent No. 2,308,547.　　　　　　　　　　　　　　January 19, 1943.

ADOLF G. SCHNEIDER.

It is hereby certified that error appears in the printed specification of the above numbered patent requiring correction as follows: Page 5, second column, line 14, claim 12, for "elements" read --element--; page 6, first column, line 28, claim 19, after the word "wheel" insert --including the planetary cage--; and that the said Letters Patent should be read with this correction therein that the same may conform to the record of the case in the Patent Office.

Signed and sealed this 6th day of April, A. D. 1943.

(Seal)　　　　　　　　　　　　　　　　　　　　Henry Van Arsdale,
　　　　　　　　　　　　　　　　　　　Acting Commissioner of Patents.